US 12,422,564 B2

(12) United States Patent
Tu et al.

(10) Patent No.: US 12,422,564 B2
(45) Date of Patent: Sep. 23, 2025

(54) INFORMATION SENDING METHOD, APPARATUS AND DEVICE, AND COMPUTER STORAGE MEDIUM

(71) Applicants: CHINA MOBILE SHANGHAI ICT CO., LTD., Shanghai (CN); CM INTELLIGENT MOBILITY, Shanghai (CN); CHINA MOBILE COMMUNICATIONS GROUP CO., LTD., Beijing (CN)

(72) Inventors: Kui Tu, Shanghai (CN); Jie Liu, Shanghai (CN); Jingyu Wang, Shanghai (CN)

(73) Assignees: CHINA MOBILE SHANGHAI ICT CO., LTD., Shanghai (CN); CM INTELLIGENT MOBILITY, Shanghai (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 372 days.

(21) Appl. No.: 18/002,660

(22) PCT Filed: Apr. 1, 2021

(86) PCT No.: PCT/CN2021/085131
§ 371 (c)(1),
(2) Date: Dec. 21, 2022

(87) PCT Pub. No.: WO2022/033046
PCT Pub. Date: Feb. 17, 2022

(65) Prior Publication Data
US 2023/0236325 A1 Jul. 27, 2023

(30) Foreign Application Priority Data
Aug. 14, 2020 (CN) .......................... 202010819515.X (51) Int. Cl.
*G01S 19/07* (2010.01)
(52) U.S. Cl.
CPC .................................. *G01S 19/071* (2019.08)
(58) Field of Classification Search
CPC ....................................................... G01S 19/071
See application file for complete search history.

(56) References Cited

U.S. PATENT DOCUMENTS

2011/0285585 A1 11/2011 Bergamo
2013/0093618 A1 4/2013 Oh
(Continued)

FOREIGN PATENT DOCUMENTS

CN 1291567 A 4/2001
CN 101109806 A 1/2008
(Continued)

OTHER PUBLICATIONS

International Search Report in the international application No. PCT/CN2021/085131, mailed on Jun. 24, 2021.
(Continued)

*Primary Examiner* — William Kelleher
*Assistant Examiner* — Hailey R Le
(74) *Attorney, Agent, or Firm* — SYNCODA LLC; Feng Ma (57) ABSTRACT

An information sending method includes: obtaining first information for positioning a terminal device, the first information comprising differential positioning information, or the first information comprising at least one of environmental information or a satellite positioning signal, and differential positioning information; and when the first information satisfies a preset condition, sending the differential positioning information to the terminal device. The method can effectively reduce the sending of unnecessary differential positioning information, thereby avoiding unnecessary (Continued)

energy consumption waste of a roadside device and the terminal device, saving the time of the terminal device to calculate position information, and improving the high-precision positioning efficiency of the system.

15 Claims, 6 Drawing Sheets

(56) References Cited

U.S. PATENT DOCUMENTS

| | | | |
|---|---|---|---|
| 2015/0149083 A1 | 5/2015 | Lee | |
| 2016/0327650 A1 | 11/2016 | Barnes | |
| 2017/0131406 A1 | 5/2017 | Li et al. | |
| 2019/0088041 A1 | 3/2019 | Lee et al. | |
| 2020/0394851 A1 | 12/2020 | Lee et al. | |
| 2021/0063162 A1* | 3/2021 | Moskowitz | G01C 21/28 |
| 2021/0247520 A1 | 8/2021 | Barnes | |

FOREIGN PATENT DOCUMENTS

| | | |
|---|---|---|
| CN | 102608632 A | 7/2012 |
| CN | 104090287 A | 10/2014 |
| CN | 105388506 A | 3/2016 |
| CN | 105929432 A | 9/2016 |
| CN | 105974453 A | 9/2016 |
| CN | 106971579 A | 7/2017 |
| CN | 108347437 A | 7/2018 |
| CN | 108845339 A | 11/2018 |
| CN | 108897025 A | 11/2018 |
| CN | 108983263 A | 12/2018 |
| CN | 109672996 A | 4/2019 |
| CN | 109975846 A | 7/2019 |
| CN | 110045405 A | 7/2019 |
| CN | 111158033 A | 5/2020 |
| CN | 111190202 A | 5/2020 |
| CN | 111314849 A | 6/2020 |
| JP | 2000314770 A | 11/2000 |
| JP | 2003344521 A | 12/2003 |
| JP | 2004184380 A | 7/2004 |
| JP | 2007333636 A | 12/2007 |
| WO | 2015129243 A1 | 9/2015 |

OTHER PUBLICATIONS

English translation of the Written Opinion of the International Search Authority in the international application No. PCT/CN2021/085131, mailed on Jun. 24, 2021, 4 pages.

Supplementary European Search Report in the European application No. 21855102.6, mailed on Nov. 17, 2023, 10 pages.

* cited by examiner

INFORMATION SENDING METHOD, APPARATUS AND DEVICE, AND COMPUTER STORAGE MEDIUM

CROSS-REFERENCE TO RELATED APPLICATIONS

This is a national phase application of International Application No. PCT/CN2021/085131 filed on Apr. 1, 2021, which claims priority to Chinese Patent Application No. 202010819515. X, filed on Aug. 14, 2020. The disclosures of the above-referenced applications are hereby incorporated by reference in their entirety.

TECHNICAL FIELD

Embodiments of the present disclosure relate to the technical field of positioning technique, and particularly to an information sending method, an apparatus, a device and a computer storage medium.

BACKGROUND

Location is a piece of basic and indispensable information for both mobile Internet and Internet of Things. However, for refined requirements of industry application, only positioning information of higher precision can bring higher value. People can know locations of a person and one thing more accurately, so as to provide better services for the person and the thing. Therefore, high-precision positioning technology is vital to applications of the mobile Internet and the Internet of Things, and especially to applications of Internet of Vehicles.

The most common positioning method is satellite positioning. However, satellite signals are easily influenced by sunspot movement, bad weather, electromagnetic interference and other factors, which are unavoidable. In order to offset these interferences, a differential positioning technology is commonly adopted in the industry.

In a cooperative vehicle infrastructure system, differential positioning information is broadcast by a Road Side Unit (RSU) of a roadside device to an On Board Unit (OBU) of a terminal. The terminal calculates an accurate location according to the received satellite positioning signal and differential positioning information. No matter whether the OBU needs the differential positioning information or not, the RSU may continuously send the differential positioning information to the OBU, and the terminal continuously performs high-precision positioning calculation, which extends calculation time of the positioning information, causes waste of energy consumption of the roadside device and the terminal, and reduces efficiency of high-precision positioning of the system.

SUMMARY

Embodiments of the present disclosure provide an information sending method, an apparatus, a device and a computer storage medium, which can determine time of sending differential positioning information according to the requirements of a terminal, reduce calculation time of the positioning information, reduce energy consumption of a roadside device and the terminal, and improve efficiency of high-precision positioning of the system.

According to a first aspect, embodiments of the present disclosure provide an information sending method, which includes the following operations.

First information for positioning a terminal is obtained. The first information includes differential positioning information. In an embodiment, the first information includes at least one of environmental information or a satellite positioning signal, and the differential positioning information.

In response to that the first information meets a preset condition, the differential positioning information is sent to the terminal.

In some embodiments, when the first information is the environmental information and the differential positioning information, the preset condition includes that the environmental information is first environmental information.

In some embodiments, the differential positioning information includes a differential value. When the first information is the differential value, the preset condition includes that the first information is greater than a preset differential threshold.

In some embodiments, when the first information is the satellite positioning signal and the differential positioning information, calculation is performed according to the satellite positioning signal and the differential positioning information to obtain a calculated location of a roadside device.

A distance difference between the calculated location and an actual location of the roadside device is determined according to the calculated location and the actual location.

In response to that the first information meets the preset condition, the differential positioning information is sent to the terminal, which includes the following operation.

In response to that the distance difference is greater than a preset distance difference threshold, the differential positioning information is sent to the terminal.

According to a second aspect, embodiments of the present disclosure provide an information sending apparatus, which includes an obtaining module and a sending module.

The obtaining module is configured to obtain first information for positioning a terminal. The first information includes differential positioning information. In an embodiment, the first information includes at least one of environmental information or a satellite positioning signal, and the differential positioning information.

The sending module is configured to send the differential positioning information to the terminal in response to that the first information meets a preset condition.

In some embodiments, when the first information is the environmental information and the differential positioning information, the preset condition includes that the environmental information is first environmental information.

In some embodiments, the differential positioning information includes a differential value. When the first information is the differential value, the preset condition includes that the first information is greater than a preset differential threshold.

In some embodiments, the apparatus further includes a calculation module. The calculation module is configured to perform calculation according to the satellite positioning signal and the differential positioning information to obtain a calculated location of a roadside device when the first information is the satellite positioning signal and the differential positioning information.

The apparatus further includes a determination module. The determination module is configured to determine a distance difference between the calculated location and an actual location of the roadside device according to the calculated location and the actual location.

The sending module is further configured to send the differential positioning information to the terminal in response to that the distance difference is greater than a preset distance difference threshold.

According to a third aspect, embodiments of the present disclosure provide a roadside device. The roadside device includes a processor and a memory that stores computer program instructions. The processor is configured to read and execute the computer program instructions to implement the above information sending method.

According to a fourth aspect, embodiments of the present disclosure provide a computer storage medium that stores computer program instructions. The computer program instructions, when executed by a processor, implement the above information sending method.

The embodiments of the present disclosure provide an information sending method, an apparatus, a device and a computer storage medium. The method includes the following operations. A roadside device obtains first information for positioning a terminal. The first information includes differential positioning information, or the first information includes at least one of environmental information or a satellite positioning signal, and the differential positioning information. It is not necessary to establish communication connection between the terminal and a high-precision positioning platform. That is, the terminal does not need a mobile communication module or have a high-precision positioning function, thereby reducing costs of devices. In response to that the first information meets a preset condition, the differential positioning information is sent to the terminal, thereby effectively reducing sending unnecessary differential positioning information, avoiding unnecessary waste of energy consumption of the roadside device and the terminal, saving time for the terminal to calculate location information, and improving efficiency of high-precision positioning of the system.

BRIEF DESCRIPTION OF THE DRAWINGS

In order to more clearly describe the technical solutions of the embodiments of the present disclosure, drawings required in the embodiments of the present disclosure would be briefly described below. Other drawings may be obtained from these drawings without any creative effort by those skilled in the art.

DETAILED DESCRIPTION

Features and exemplary embodiments of various aspects of the present disclosure would be described in detail below.

In order to make the objectives, technical solutions, and advantages of the present disclosure clearer, the present disclosure would be further described below in detail with reference to the drawings and specific embodiments. It is to be understood that the specific embodiments described herein are only intended to explain the present disclosure rather than limit the present disclosure. For those skilled in the art, the present disclosure may be implemented without some of these specific details. The following description of the embodiments is intended only to provide a better understanding of the present disclosure by illustrating examples of the present disclosure.

It should be noted that the relationship terms used herein, such as "first", "second" and the like are only configured for distinguishing one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles, or equipment, including a series of elements, include not only those elements that have been listed, but also other elements that are not specifically listed or the elements intrinsic to these processes, methods, articles, or equipment. Without further limitations, elements defined by the wording "include(s) . . . ", "comprise(s) . . . " do not exclude additional identical elements in the processes, methods, articles, or equipment including the listed elements At present, the most common positioning method is satellite positioning. The four major global satellite positioning systems are Beidou of China, Global Positioning System (GPS) of the United States, Global Navigation Satellite System (GLONASS) of Russia and Galileo of the European Union. Working principles of various satellite positioning systems are roughly the same. Taking the GPS as an example, the GPS is composed of 24 working satellites, so that more than 4 satellites may be observed anywhere in the world at any time. A distance between a satellite at a known location and a user receiver is measured, and then the specific location of the receiver can be known by integrating data of multiple satellites. It can be seen that quality of received satellite signals has a great relationship with a positioning precision. However, the satellite signals are easily influenced by sunspot movement, bad weather, electromagnetic interference and other factors, which are unavoidable. In order to offset these interferences, a differential positioning technology is commonly adopted in the industry. A principle of the differential positioning technology is to measure a current satellite signal by setting a ground reference station, and calculate a differential parameter of the signal according to a known actual position of the ground reference station and the received satellite signal. The differential parameter includes the influences caused by various interference factors. The reference station sends the differential parameter to the terminal. The terminal uses the differential parameter to correct its measurement result to obtain an accurate positioning result. Therefore, in order to achieve high-precision positioning, the device for positioning needs to receive differential positioning information.

In the related art, there are two main methods for the terminal to obtain the differential positioning information. One method is that the terminal mainly communicates with a server of a high-precision positioning platform through a mobile communication module to query the differential positioning information. This method requires the terminal to be equipped with the mobile communication module and have the high-precision positioning function, which increases the costs of the terminal. The other method is that in a road scenario, a cooperative vehicle infrastructure system broadcasts differential positioning information to an OBU of the terminal through an RSU in a roadside device so as to offset the influences caused by various interference factors. However, in a case that weather conditions are good, the various interference factors are weakened, and at this time, the terminal may obtain a high-precision positioning result without the differential positioning information. Therefore, in a good environment, if the RSU continues to broadcast the differential positioning information, unnecessary transmission of the differential positioning information and high-precision calculation at the terminal side may be caused, which extends calculation time of the positioning information at the terminal side, causes waste of energy consumption of the RSU, OBU and the terminal, and reduces efficiency of high-precision positioning of the system.

In order to solve the problems in the related art, the embodiments of the present disclosure provide an information sending method, an apparatus, a device and a computer storage medium.

In the embodiments of the present disclosure, the roadside device obtains first information for positioning a terminal, determines whether the differential positioning information improves a precision of the corrected positioning result information according to a relationship between the first information and a preset condition, and controls the RSU to send the differential positioning information to the roadside terminal only when the terminal needs the differential positioning information to correct the positioning result, so that the terminal can use the differential positioning information to complete accurate positioning, thereby avoiding unnecessary waste of energy consumption of the roadside device and the terminal, saving time for the terminal to calculate location information, and improving efficiency of high-precision positioning of the system.

An information sending system provided by an embodiment of the present disclosure is first described below.

Figure 1:
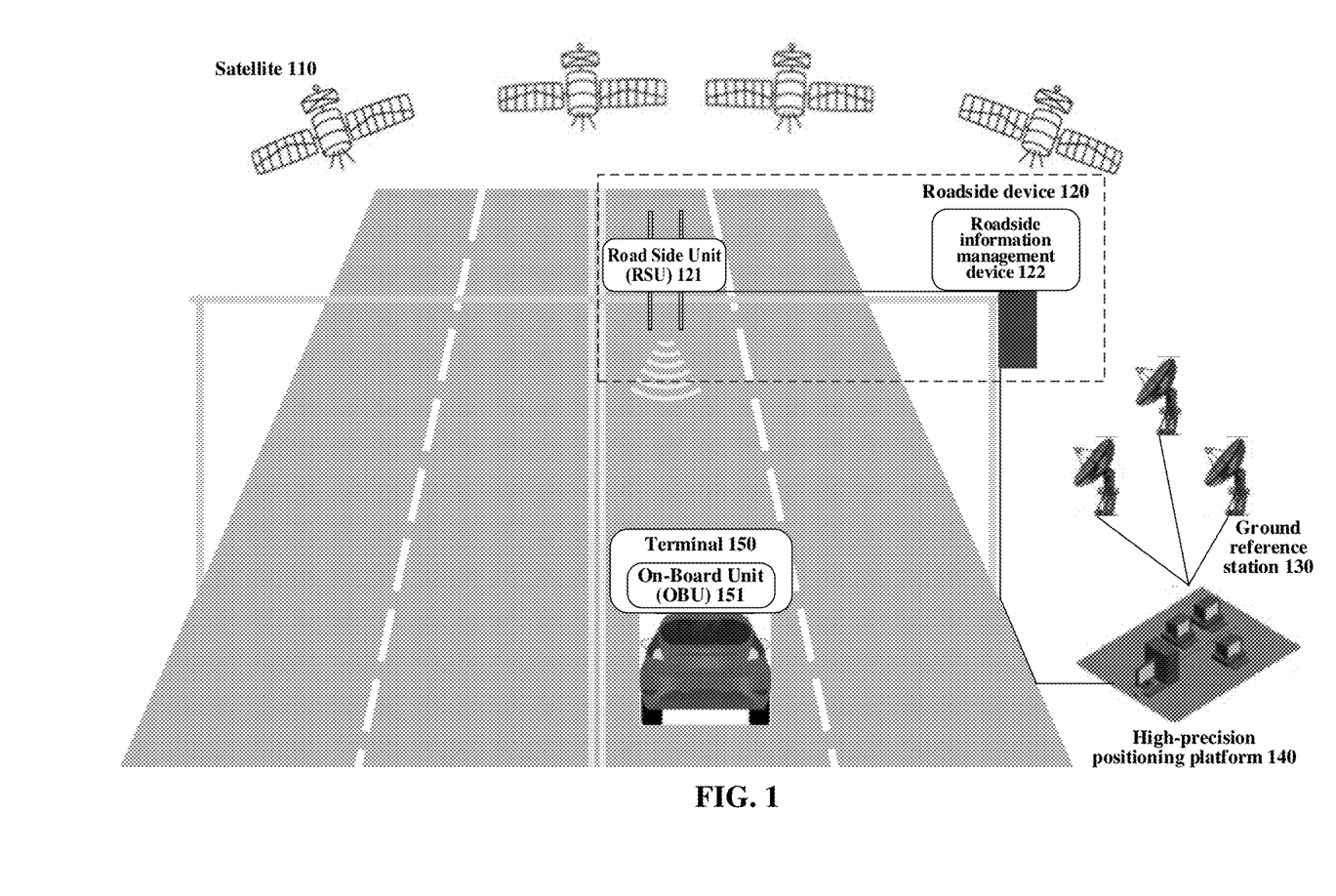
FIG. 1 is a structural diagram of an information sending system according to an embodiment of the present disclosure.

FIG. 1 illustrates a structural diagram of the information sending system according to the embodiment of the present disclosure.

As illustrated in FIG. 1, the information sending system includes a satellite 110, a roadside device 120, ground reference stations 130, a high-precision positioning platform 140 and a terminal 150.

The roadside device 120 includes an RSU 121 and a roadside information management device 122. The RSU 121 is installed on a roadside, and may communicate with a communication device running on a highway through Dedicated Short Range Communication (DSRC) and/or Long Term Evolution-Vehicle (LTE-V) technology so as to send and receive various information. The RSU 121 in the embodiments of the present disclosure is also configured to broadcast to the roadside differential positioning information corresponding to ground reference stations 130 that are suitable for positioning a terminal in this area.

An OBU 151 is installed on the terminal 150, and the OBU 151 may communicate with the RSU 121 through the DSRC and/or LTE-V technology so as to send and receive various information. The OBU 151 in the embodiments of the present disclosure may also be configured to receive the differential positioning information broadcast by the RSU 121 to the roadside, and the differential positioning information is corresponding to the ground reference stations 130 that are suitable for the terminal 150 in this area. The way that the RSU 121 sends the differential positioning information to the roadside may be that the RSU 121 sends the differential positioning information to the roadside at a regular time, or may be that the RSU 121 sends the differential positioning information to the roadside when detecting the OBU 151, or may be that the OBU 151 requests the RSU 121 to send the differential positioning information when the terminal 150 needs to perform high-precision positioning. The terminal 150 may be a car, a truck, or some other vehicles with a positioning system, which is not limited here.

In a satellite positioning system, the satellite 110 sends satellite positioning signals. The ground reference stations 130 continuously observes the satellite positioning signals for a long time, and sends the observation data to the high-precision positioning platform 140 through the communication device in real time or at a regular time. The high-precision positioning platform 140 calculates the observation data of various ground reference stations 130 to obtain the differential positioning information. The roadside information management device 122 obtains environmental information and the differential positioning information, receives the satellite positioning signals from the satellite 110, determines whether the differential positioning information improves a precision of the corrected positioning result according to a preset condition to obtain a judgment result 1: the differential positioning information improves the precision of the corrected positioning result, and a judgment result 2: the differential positioning information does not improve the precision of the corrected positioning result, and generates control information according to the two judgment results. The RSU 121 receives the control information, and sends the differential positioning information to the roadside terminal 150 according to the control information in response to that the control information includes the judgment result 1. The OBU 151 receives the differential positioning information, and the terminal 150 calculates a high-precision positioning result of the terminal 150 according to the received satellite positioning signals and the differential positioning information received by the OBU 151.

Figure 2:
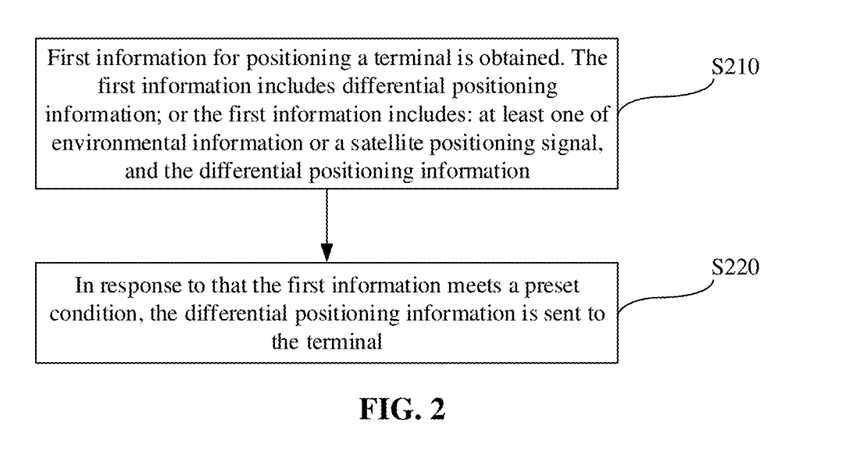
FIG. 2 is a flowchart of an information sending method according to an embodiment of the present disclosure.

FIG. 2 illustrates a flowchart of an information sending method according to an embodiment of the present disclosure. As illustrated in FIG. 2, the method includes the following operations.

At S210, first information for positioning a terminal is obtained. The first information includes differential positioning information, or the first information includes at least one of environmental information or a satellite positioning signal, and the differential positioning information.

The roadside device 120 provides the roadside terminal 150 with differential positioning information that can be used to correct the location information. The differential positioning information is obtained from the high-precision positioning platform 140 through the roadside information management device 122 of the roadside device 120. The differential positioning information at least includes errors such as a clock error between the satellite and the receiver, an atmospheric propagation delay and multipath effect. In order to reduce unnecessary differential positioning information sent by the RSU 121 of the roadside device 120 to the OBU 151 of the terminal 150, the roadside information management device 122 may determine whether to send the differential positioning information to the OBU 151 according to the differential positioning information and may also determine whether to send the differential positioning information to the OBU 151 according to at least one of the environmental information or the satellite positioning signal, and the differential positioning information. The environmental information includes airflow information, air temperature information, Particulate Matter (PM) value and other factors that influence weather conditions.

At S220, in response to that the first information meets a preset condition, the differential positioning information is sent to the terminal.

In response to that the first information meets the preset condition, the terminal 150 needs the differential positioning information to assist the high-precision positioning. At this time, the roadside information management device 122 sends the differential positioning information to the terminal 150. The first information may only include the differential positioning information. Furthermore, the first information may also include the environmental information and the differential positioning information or may include the satellite positioning signal and the differential positioning information. In a case that auxiliary information contained in the first information is different, the corresponding preset conditions are different, which meets any cases of whether the roadside information management device 122 needs to send the differential positioning information to the terminal 150, and ensures an accuracy of calculating the positioning result of the terminal 150 in any environment.

In the embodiments of the present disclosure, the roadside device obtains the first information for positioning the terminal. The first information includes the differential positioning information, or the first information includes at least one of the environmental information or the satellite positioning signal, and the differential positioning information. It is not necessary to establish communication connection between the terminal and a high-precision positioning platform. That is, the terminal does not need a mobile communication module or have a high-precision positioning function, thereby reducing costs of devices. In response to that the first information meets the preset condition, the differential positioning information is sent to the terminal, thereby effectively reducing sending unnecessary differential positioning information, avoiding unnecessary waste of energy consumption of the roadside device and the terminal, saving time for the terminal to calculate location information, and improving efficiency of high-precision positioning of the system.

In an embodiment, when the first information is the environmental information and the differential positioning information, the preset condition includes that the environmental information is first environmental information.

The first environmental information may include low air visibility information, rainy day information, airflow fluctuation information and other environmental information that represents bad weather conditions. The roadside information management device 122 of the roadside device 120 may be provided with an environmental monitoring module to obtain the environmental information, or may be connected to an environmental information issue platform to obtain the environmental information.

The roadside information management device 122 may determine the weather condition according to the environmental information. High air visibility, sunny weather and stable airflow etc., mean that the weather condition is good. That is, an interference of the atmosphere to the satellite positioning signal is small, and the differential positioning information has little influence on calculating the positioning result of the terminal 150. Therefore, the terminal 150 may not need the differential positioning information to assist in positioning. Control information is generated according to the judgment result and sent to the RSU 121, and the RSU 121 does not send the differential positioning information to the OBU 151 according to the control information. The terminal 150 only calculates its location according to the satellite positioning signal.

In a case that the environmental information includes the first environmental information, (i.e. there are lightning, thunder, heavy rain, turbulent air flow, and the like), the weather condition is bad. That is, the atmosphere interferes with the satellite positioning signal greatly, and the differential positioning information has a great influence on calculating the positioning result of the terminal 150. Therefore, the terminal 150 needs the differential positioning information to assist in positioning. The control information is generated according to the judgment result and sent to the RSU 121, and the RSU 121 sends the differential positioning information to the OBU 151 according to the control information. The terminal 150 calculates its location according to the differential positioning information and the satellite positioning signal.

In an embodiment, the differential positioning information includes a differential value. When the first information is the differential value, the preset condition includes that the first information is greater than a preset differential threshold.

In a case that it is not easy to determine the weather condition according to the environmental information at present, the differential value in the differential positioning information can be acquired, and the differential value can be compared with the preset differential threshold. The differential value may include the error values such as the clock error between the satellite 110 and the receiver, the atmospheric propagation delay and the multipath effect, and is compared with the preset differential threshold to determine whether the differential value is within a range of the preset differential threshold.

In a case that the differential value is within the range of the preset differential threshold (i.e. the differential value is smaller than the preset differential threshold), it is considered that the interference to satellite positioning signal is small, and the differential positioning information has little influence on calculating the positioning result of the terminal 150. Therefore, the terminal 150 may not need the differential positioning information to assist in positioning. The control information is generated according to the judgment result and sent to the RSU 121, and the RSU 121 does not send the differential positioning information to the OBU 151 according to the control information. The terminal 150 only calculates its location according to the satellite positioning signal.

In a case that the differential value exceeds the range of the preset differential threshold (i.e. the differential value is greater than the preset differential threshold), it is considered that the interference to satellite positioning signal is large, and the differential positioning information has a great influence on calculating the positioning result of the terminal 150. Therefore, the terminal 150 needs the differential positioning information to assist in positioning. The control information is generated according to the judgment result and sent to the RSU 121, and the RSU 121 sends the differential positioning information to the OBU 151 according to the control information. The terminal 150 calculates its location according to the differential positioning information and the satellite positioning signal.

In a case that the process of sending the differential positioning information by the RSU 121 is triggered by a request from the OBU 151 to the RSU 121, the request from the OBU 151 may further carry a positioning precision requirement, and the roadside information management device 122 may determine the preset differential threshold according to the positioning precision requirement. The higher the positioning precision requirement is, the smaller the preset differential threshold is set, otherwise, the greater the preset differential threshold is. Therefore, in a case that the positioning precision requirement is not high, the sending of unnecessary differential positioning information may be effectively avoided, thereby achieving the purpose of saving energy consumption and shortening the time for the terminal 150 to calculate the location information.

In an embodiment, when the first information is the satellite positioning signal and the differential positioning information, calculation is performed according to the satellite positioning signal and the differential positioning information to obtain a calculated location of the roadside device 120. A distance difference between the calculated location and an actual location of the roadside device 120 is determined according to the calculated location and the actual location. In response to that the first information meets the preset condition, the differential positioning information is sent to the terminal 150, which includes the operation that the differential positioning information is sent to the terminal 150 in response to that the distance difference is greater than a preset distance difference threshold.

The roadside information management device 122 receives the satellite positioning signal from the satellite 110, and obtains the positioning information in the satellite positioning signal. The positioning information at least includes coordinates of the satellite 110 and propagation delay of the satellite positioning signal. The roadside information management device 122 selects a positioning result according to the positioning information, and corrects the positioning result using the differential positioning information to obtain the calculated location of the roadside device 120. The distance difference between the calculated location and the actual location of the roadside device 120 is determined according to the calculated location and the actual location.

Specifically, according to the calculated location of the roadside device 120, coordinates of the calculated location $(x_1, y_1, z_1)$ are obtained. When the roadside device 120 is deployed, the actual location of the roadside device 120 is recorded and stored. According to the actual location, coordinates of the actual location $(x_2, y_2, z_2)$ are obtained. The distance between the coordinates of the calculated location and the corresponding coordinates of the actual location is calculated according to the following formula (1):

$$d=\sqrt{(x_1-x_2)^2+(y_1-y_2)^2+(z_1-z_2)^2} \qquad (1).$$

The distance d between the calculated location and the actual location of the roadside device 120 is compared with the preset distance difference threshold to determine whether the distance d between the calculated location and the actual location of the roadside device 120 is within the range of the preset distance difference threshold. In a case that the distance d is within the range of the preset distance difference threshold (i.e. the distance d is smaller than the preset distance difference threshold), the differential positioning information has little influence on calculating the positioning result of the terminal 150. Therefore, the terminal 150 may not need the differential positioning information for correction. The control information is generated according to the judgment result and sent to the RSU 121, and the RSU 121 does not send the differential positioning information to the OBU 151 according to the control information. The terminal 150 only calculates its location according to the satellite positioning signal.

In a case that the distance d exceeds the range of the preset differential threshold (i.e. the distance d is greater than the preset distance difference threshold), the differential positioning information has a great influence on calculating the positioning result of the terminal 150. Therefore, the terminal 150 needs the differential positioning information for correction. The control information is generated according to the judgment result and sent to the RSU 121, and the RSU 121 sends the differential positioning information to the OBU 151 according to the control information. The terminal 150 calculates its location according to the differential positioning information and the satellite positioning signal.

Figure 3:
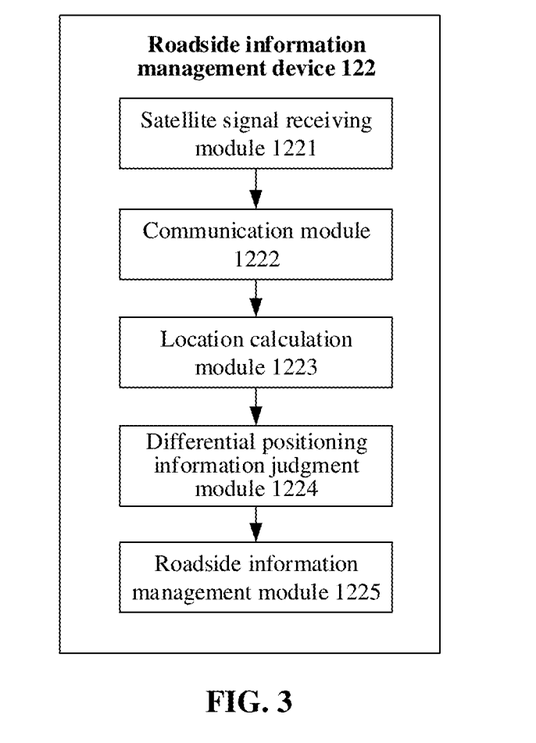
FIG. 3 is a structural diagram of a roadside information management device according to an embodiment of the present disclosure.

In an embodiment, as illustrated in FIG. 3, the roadside information management device 122 includes a satellite signal receiving module 1221, a communication module 1222, a location calculation module 1223, a differential positioning information judgment module 1224 and a roadside information management module 1225.

The roadside information management device 122 receives the satellite positioning signal through the satellite signal receiving module 1221 to obtain the positioning information in the satellite positioning signal. The communication module 1222 obtains the differential positioning information from the high-precision positioning platform 140. The location calculation module 1223 calculates the calculated location of the roadside device 120 according to the positioning information and the differential positioning information. The distance difference between the calculated location and the actual location of the roadside device 120 is obtained according to the calculated location and the actual location of the roadside device 120.

The differential positioning information judgment module 1224 determines whether the differential positioning information influences the positioning result of the roadside device 150 according to the environmental information or the differential positioning information, or according to the relationship between the preset condition and the distance difference between the calculated location and the actual location of the roadside device 120. There are three judgment methods.

Figure 4:
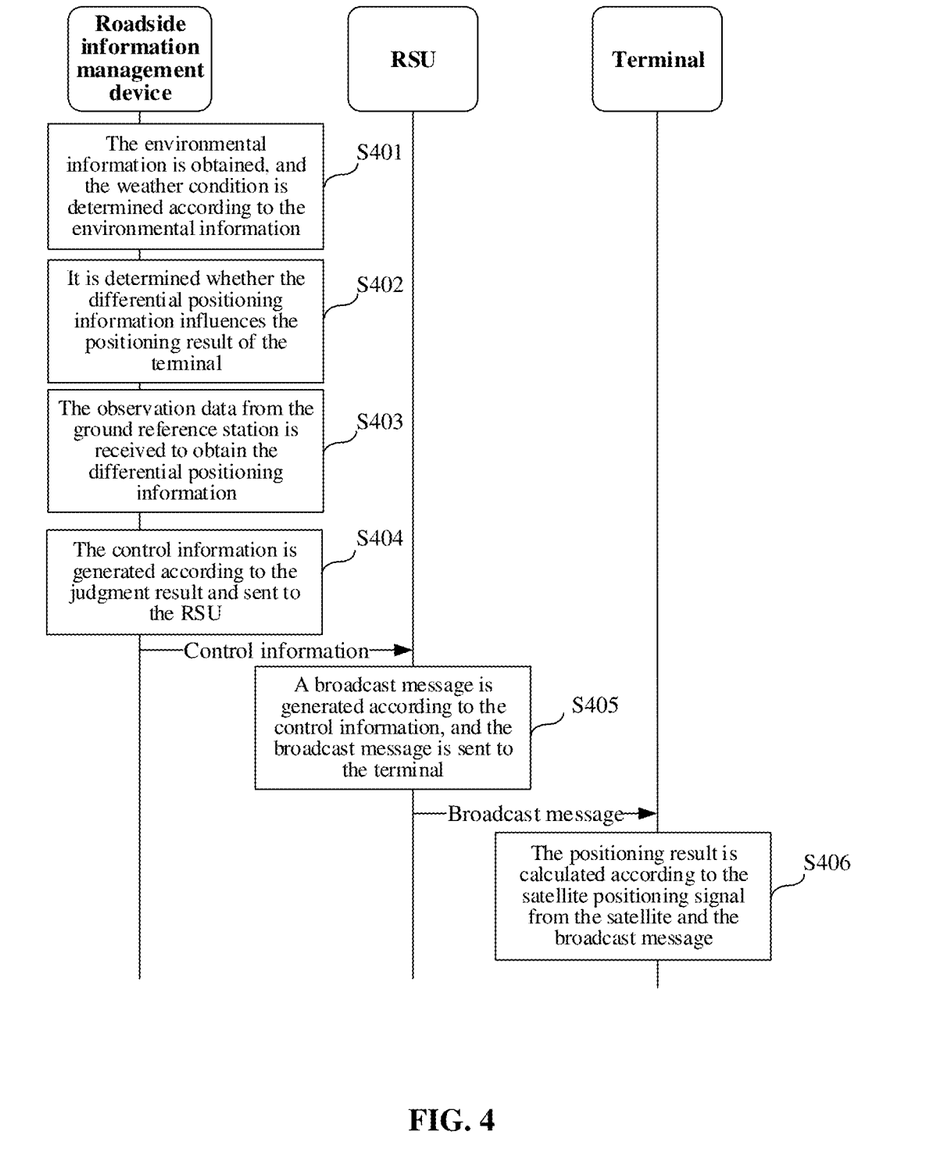
FIG. 4 is a flowchart of an information sending method according to an embodiment of the present disclosure.

1. As illustrated in FIG. 4, the judgment method includes the following operations.

At S401, the environmental information is obtained, and the weather condition is determined according to the environmental information.

At S402, it is determined whether the differential positioning information influences the positioning result of the terminal. In the case that the weather is good, the differential positioning information has little influence on calculating the positioning result of the terminal, and the terminal does not need the differential positioning information to assist in positioning. Therefore, S404 is directly executed with S403 skipped. In the case that the weather condition is bad, the differential positioning information has a great influence on calculating the positioning result of the terminal, and the terminal needs the differential positioning information to assist in positioning. Therefore, S403 is executed.

At S403, the observation data from the ground reference station is received to obtain the differential positioning information. The differential positioning information at least includes the errors such as the clock error between the satellite and the receiver, the atmospheric propagation delay and the multipath effect.

At S404, the control information is generated according to the judgment result and sent to the RSU.

The judgment results include the judgment result 1: the differential positioning information is needed for calculating the positioning result of the terminal, and the judgment result 2: the differential positioning information is not needed for calculating the positioning result of the terminal. In case of the judgment result 1, the control information includes the differential positioning information. In case of the judgment result 2, the control information does not include the differential positioning information. The roadside information management module 1225 sends the control information to the RSU.

At S405, a broadcast message is generated according to the control information, and the broadcast message is sent to the terminal.

In a case that the control information includes the judgment result 1 (i.e. the control information includes the differential positioning information), the broadcast message includes the differential positioning information, and the broadcast message is sent to the terminal to improve the precision of calculating the positioning result of the terminal. In a case that the control information includes the judgment result 2 (i.e. the control information does not include the differential positioning information), the broadcast message does not include the differential positioning information, and the broadcast message is sent to the terminal.

The RSU can send the differential positioning information to the roadside terminal in the following three ways.

(1) The RSU sends the differential positioning information to the roadside terminal at a regular time.

(2) The RSU sends the differential positioning information in response to detecting an OBU of the terminal.

(3) In a case that the terminal needs the high-precision positioning, the OBU requests the RSU to send the differential positioning information.

At S406, the positioning result is calculated according to the satellite positioning signal from the satellite and the broadcast message.

The OBU receives the broadcast message. In the case that the broadcast message includes the differential positioning information, the terminal calculates an accurate positioning result according to the positioning information in the satellite positioning signal from the satellite and the differential positioning information. In the case that the broadcast message does not include the differential positioning information, the terminal calculates the positioning result only according to the positioning information in the satellite positioning signal from the satellite. Although the differential positioning information is not used for the correction, the positioning result is reasonably accurate since the satellite positioning signal is less influenced by external environment.

The judgment method does not need to use the satellite signal receiving module 1221 and the location calculation module 1223, thereby minimizing the waste of energy consumption of the roadside device.

Figure 5:
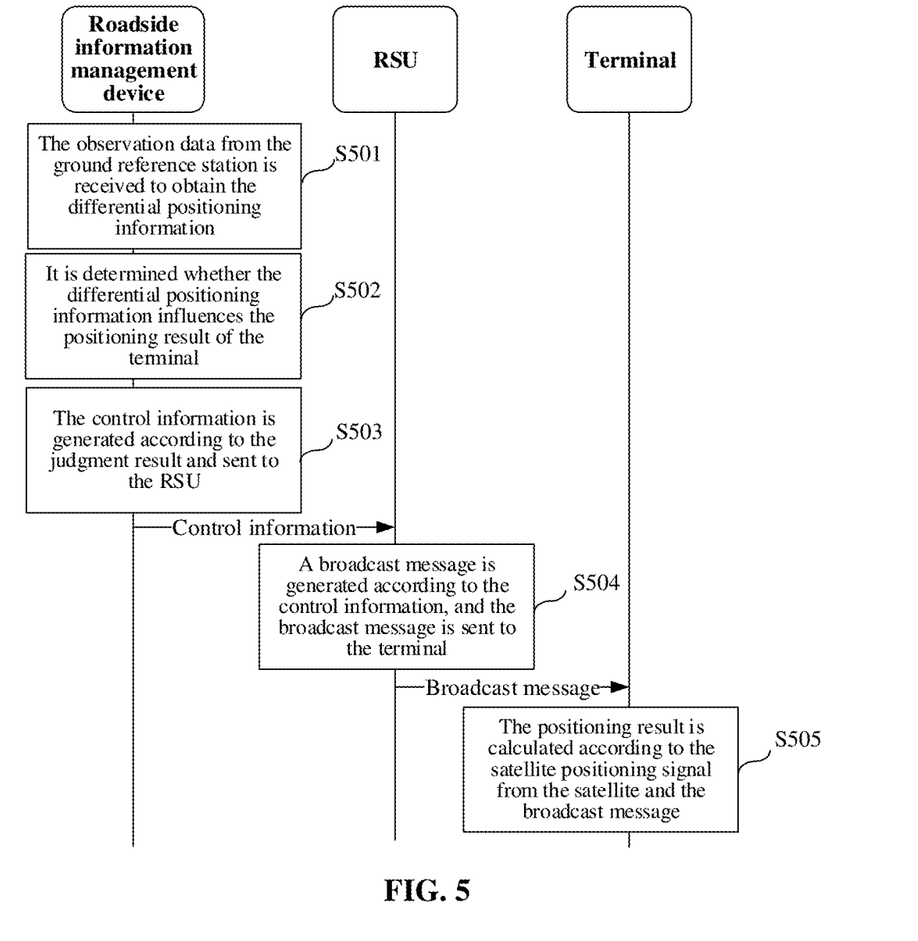
FIG. 5 is a flowchart of an information sending method according to an embodiment of the present disclosure.

2. As illustrated in FIG. 5, the judgment method includes the following operations.

At S501, the observation data from the ground reference station is received to obtain the differential positioning information.

At S502, it is determined whether the differential positioning information influences the positioning result of the terminal.

The differential value is obtained according to the differential positioning information. The differential value is compared with the preset differential threshold. In the case that the differential value is greater than the preset differential threshold, the differential positioning information has a great influence on calculating the positioning result of the terminal, and the judgment result 1 (i.e. the terminal needs the differential positioning information to assist in positioning) is generated. In the case that the differential value is smaller than the preset differential threshold, the differential positioning information has little influence on calculating the positioning result of the terminal, and the judgment result 2 (i.e. the terminal does not need the differential positioning information to assist in positioning) is generated.

The operations of S503 to S505 are the same as those of S404 to S406, which will not be repeated here.

The judgment method does not need to use the satellite signal receiving module 1221 and the location calculation module 1223, thereby minimizing the waste of energy consumption of the roadside device.

Figure 6:
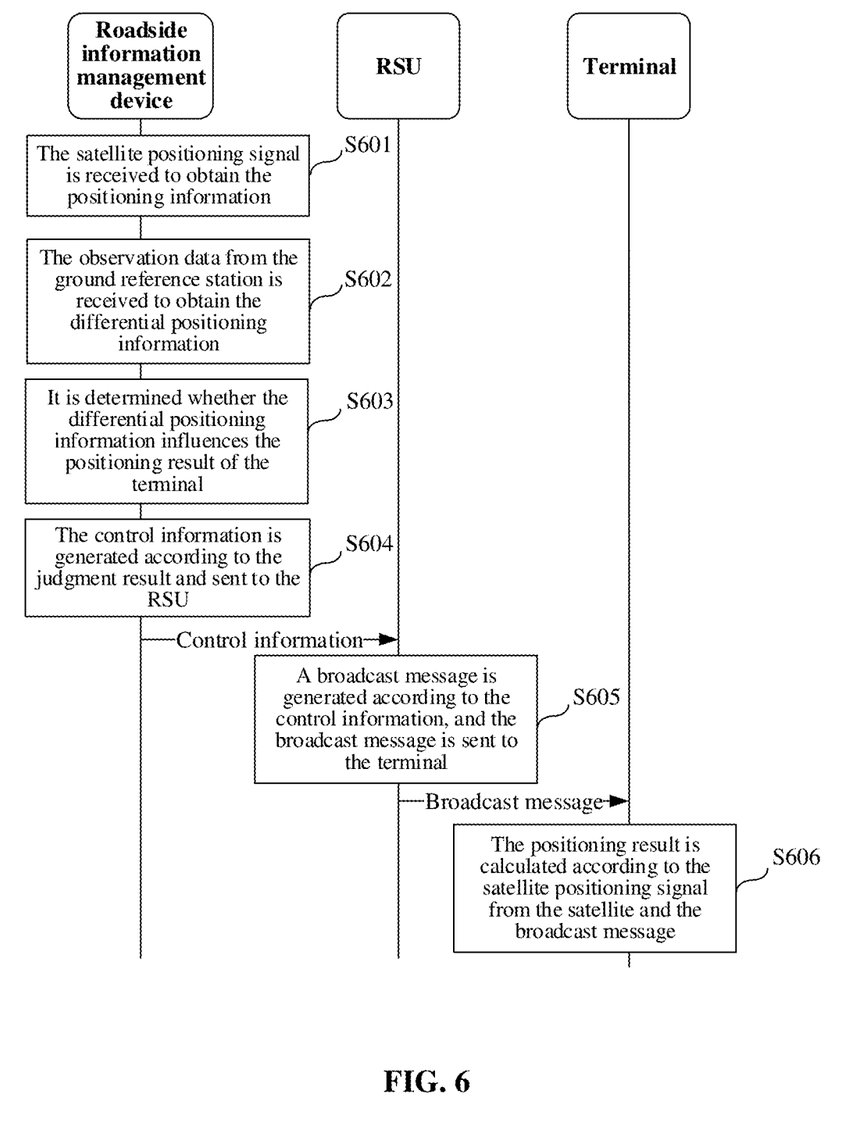
FIG. 6 is a flowchart of an information sending method according to an embodiment of the present disclosure.

3. As illustrated in FIG. 6, the judgment method includes the following operations.

At S601, the satellite positioning signal is received to obtain the positioning information. The positioning information at least includes the coordinates of the satellite and the propagation delay of the satellite positioning signal.

At S602, the observation data from the ground reference station is received to obtain the differential positioning information.

At S603, it is determined whether the differential positioning information influences the positioning result of the terminal.

The location calculation module 1223 calculates the calculated location of the roadside device, obtains the distance difference according to the calculated location and the actual location of the roadside device, and compares the distance difference with the preset distance difference threshold. In the case that the distance difference is greater than the preset distance difference threshold, the differential positioning information has a great influence on calculating the positioning result of the terminal, and the judgment result 1 (i.e. the terminal needs the differential positioning information to assist in positioning) is generated. In the case that the distance difference is smaller than the preset distance difference threshold, the differential positioning information has little influence on calculating the positioning result of the terminal, and the judgment result 2 (i.e. the terminal does not need the differential positioning information to assist in positioning) is generated.

The operations of S604 to S606 are the same as those of S404 to S406, which will not be repeated here.

The functions of the roadside information management device may be implemented independently by a device illustrated in FIG. 3, and other modules other than the satellite signal receiving module may also be integrated in the RSU or the OBU or the high-precision positioning platform. If the modules are arranged at the roadside in form of a single device or integrated in the RSU or the OBU, costs of device may be increased. However, the time delay for the OBU to obtain the differential positioning information may be reduced. If the modules are integrated in the high-precision positioning platform, costs of the roadside or vehicle-side device may be reduced. However, the time delay for the OBU to obtain the differential positioning information may be increased. Those skilled may choose an appropriate way to implement the functions of the device according to the requirements of costs of device and the time delay.

In the embodiments of the present disclosure, the roadside device obtains the first information for positioning the terminal. The first information includes the differential positioning information, or the first information includes at least one of the environmental information or the satellite positioning signal, and the differential positioning information. It is not necessary to establish communication connection between the terminal and the high-precision positioning platform. That is, the terminal does not need a mobile communication module or have a high-precision positioning function, thereby reducing costs of devices. In response to that the first information meets the preset condition, the differential positioning information is sent to the terminal, thereby effectively reducing sending unnecessary differential positioning information, avoiding unnecessary waste of energy consumption of the roadside device and the terminal, saving time for the terminal to calculate location information, and improving efficiency of high-precision positioning of the system. The embodiments of the present disclosure are suitable for high-precision satellite positioning requirements including but not limited to cooperative vehicle infrastructure scenarios such as highways and urban highways.

Figure 7:
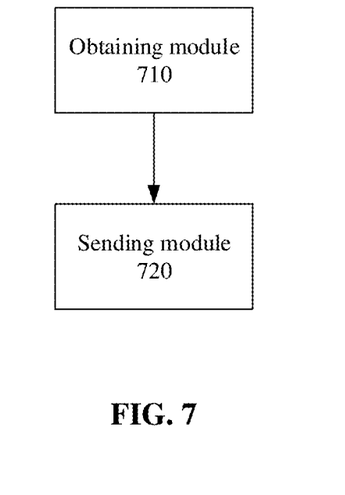
FIG. 7 is a structural diagram of an information sending apparatus according to an embodiment of the present disclosure.

FIG. 7 is a structural diagram of an apparatus according to an embodiment of the present disclosure. As illustrated in FIG. 7, the apparatus includes an obtaining module 710 and a sending module 720.

The obtaining module 710 is configured to obtain first information for positioning a terminal. The first information includes differential positioning information. Alternatively, the first information includes at least one of environmental information or a satellite positioning signal, and the differential positioning information.

The sending module 720 is configured to send the differential positioning information to the terminal in response to that the first information meets a preset condition.

In an embodiment, when the first information is the environmental information and the differential positioning information, the preset condition includes that the environmental information is first environmental information.

In an embodiment, the differential positioning information includes a differential value. When the first information is the differential value, the preset condition includes that the first information is greater than a preset differential threshold.

In an embodiment, the apparatus further includes a calculation module. The calculation module is configured to perform calculation according to the satellite positioning signal and the differential positioning information to obtain a calculated location of a roadside device when the first information is the satellite positioning signal and the differential positioning information.

The apparatus further includes a determination module. The determination module is configured to determine a distance difference between the calculated location and an actual location of the roadside device according to the calculated location and the actual location.

The sending module is specifically configured to send the differential positioning information to the terminal in response to that the distance difference is greater than a preset distance difference threshold.

Each module of the apparatus illustrated in FIG. 7 has the function of implementing each of the operations in FIG. 2, and can achieve the corresponding technical effects, which would not be repeated here for briefness of description.

Figure 8:
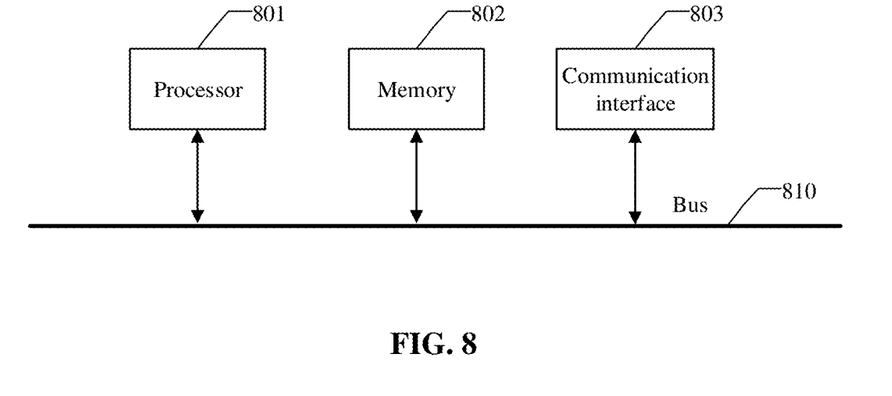
FIG. 8 is a structural diagram of a roadside device according to an embodiment of the present disclosure.

FIG. 8 is a structural diagram of an information sending hardware according to an embodiment of the present disclosure.

A roadside device includes a processor 801 and a memory 802 that stores computer program instructions.

Specifically, the processor 801 may include a Central Processing Unit (CPU), or an Application Specific Integrated Circuit (ASIC), or one or more integrated circuits that can be configured to implement the embodiments of the present disclosure.

The memory 802 may include a high-capacity memory for storing data or instructions. By way of example rather than limitation, the memory 802 may include a Hard Disk Driver (HDD), a floppy disk drive, a flash memory, an optical disk, a magneto-optical disk, a tape, a Universal Serial Bus (USB) driver, or a combination of two or more of the above. In an example, the memory 802 may include a removable or irremovable (or fixed) medium, or the memory 802 is a nonvolatile solid-state memory. The memory 802 may be inside or outside a disaster recovery device of an integrated gateway.

In an example, the memory 802 may include a Read-Only Memory (ROM), a Random Access Memory (RAM), a magnetic disk storage media device, an optical storage media device, a flash memory device, and electrical, optical or other physical/tangible memory storage devices. Therefore, the memory 802 generally includes one or more tangible (non-transitory) computer-readable storage media (e.g., a memory device) encoded with software including computer-executable instructions. When executed (e.g., by one or more processors), the software is executed to implement the operations described with reference to the methods according to the first aspect of the embodiments of the present disclosure.

The processor 801 reads and executes the computer program instructions stored in the memory 802 so as to implement the operations of S210 to S220 in the embodiments illustrated in FIG. 2, and achieve the corresponding technical effects achieved by executing the operations in the embodiments illustrated in FIG. 2, which would not be repeated here for briefness of description.

In an example, the roadside device may further include a communication interface 803 and a bus 810. As illustrated in FIG. 8, the processor 801, the memory 802, and the communication interface 803 are connected and communicate with one another through the bus 810.

The communication interface 803 is mainly configured to implement communications between each module, apparatus, unit, and/or device in the embodiments of the present disclosure.

The bus 810 includes hardware, software, or both, and couples information sending components. By way of example rather than limitation, the bus may include an Accelerated Graphics Port (AGP) or other graphics bus, an Extended Industry Standard Architecture (EISA) bus, a Front Side Bus (FSB), a Hyper Transport (HT) interconnection, an Industry Standard Architecture (ISA) bus, an Infiniband interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association (VESA) Local Bus (VLB) or other suitable bus, or a combination of two or more of the above. If appropriate, the bus 810 may include one or more buses. Although a specific bus is described and illustrated in the embodiments of the present disclosure, any suitable bus or interconnection is considered in the embodiments of the present disclosure.

The roadside device may execute the information sending method in the embodiments of the present disclosure based on differential positioning information, environmental information, a satellite positioning signal and preset thresholds, thereby implementing the information sending method and apparatus described with respect to FIG. 2 and FIG. 7.

In addition, in combination with the information sending method in the above-mentioned embodiments, embodiments of the present disclosure provide a computer storage medium for implementation. The computer storage medium stores computer program instructions. The computer program instructions, when executed by a processor, implement any information sending method in the above-mentioned embodiments.

It is to be noted that the embodiments of the present disclosure are not to be limited to specific configurations and processing described above and illustrated in the figures. For brevity, detailed descriptions about known methods are omitted herein. Multiple specific operations are described and illustrated in the above-mentioned embodiments as examples. However, the process of the method of the embodiments of the present disclosure is not limited to the described and illustrated specific operations, and those skilled in the art may make various variations, modifications, and additions or change a sequence of the operations after understanding the spirit of the embodiments of the present disclosure.

The function block illustrated in the block diagram may be implemented as hardware, software, firmware, or a combination thereof. When being implemented as hardware, the function block may be, for example, an electronic circuit, an Application Specific Integrated Circuit (ASIC), suitable firmware, plug-in, functional card, and the like. When being implemented as software, elements of the embodiments of the present disclosure are programs or code segments for executing a required task. The programs or the code segments may be stored in a machine-readable medium, or transmitted on a transmission medium or communication link through a data signal contained in a carrier. The "machine-readable medium" may include any medium capable of storing or transmitting information. Examples of the machine-readable medium include an electronic circuit, a semiconductor memory device, a ROM, a flash memory, an Erasable ROM (EROM), a floppy disk, a Compact Disc ROM (CD-ROM), an optical disk, a hard disk, an optical fiber medium, a Radio Frequency (RF) link, etc. The code segments may be downloaded through a computer network, such as the Internet and an intranet.

It is also to be noted that some methods or systems are described in the exemplary embodiments mentioned in the embodiments of the present disclosure based on a series of operations or apparatuses. However, the embodiments of the present disclosure are not limited to the sequence of the operations. That is, the operations may be executed according to the sequence mentioned in the embodiments, or a sequence different from that in the embodiments, or multiple operations may be executed at the same time.

Various aspects of the present disclosure are described above with reference to flowcharts and/or block diagrams of the method, apparatus (system) and computer program product according to the embodiments of the present disclosure. It is to be understood that each block in the flowcharts and/or the block diagrams and a combination of each block in the flowcharts and/or the block diagrams may be implemented by computer-readable program instructions. These computer program instructions may be provided to processors of a general-purpose computer, a special-purpose computer, or other programmable data processing apparatus to produce a machine, so that the instructions executed via the processor of the computer or other programmable data processing apparatus enable the implementation of the functions/actions specified in one or more blocks of the flowchart and/or block diagram. The processor may be, but is not limited to, a general-purpose processor, a special-purpose processor, a special-application processor, or a field programmable logic circuit. It is also to be understood that each block in the block diagram and/or flowchart, and a combination of blocks in the block diagram and/or flowchart, may also be implemented by special-purpose hardware that executes specified functions or actions, or may be implemented by a combination of special-purpose hardware and computer instructions.

The above are only the specific implementation modes of the present disclosure. Those skilled in the art may clearly understood that specific working processes of the systems, modules, and units described above may refer to the corresponding processes in the method embodiments and will not be elaborated herein for ease and briefness of description. It is to be understood that the scope of protection of the application is not limited thereto. Any equivalent modifications or replacements apparent to those skilled in the art within the technical scope disclosed by the present disclosure shall fall within the scope of protection of the present disclosure.

What is claimed is:

1. An information ag-transmission method, performed by a roadside device, comprising:

obtaining first information for positioning a terminal, wherein the first information comprises differential positioning information; or the first information comprises: at least one of environmental information or a satellite positioning signal, and the differential positioning information, wherein the differential positioning information comprises a differential value, and the differential value comprises a clock error between a satellite and a receiver, an atmospheric propagation delay and multipath effect; and determining whether the first information meets a preset condition, and in response to that the first information meets the preset condition, sending the differential positioning information to the terminal, wherein the method further comprises:

receiving a request from the terminal, wherein the request includes a positioning precision requirement; and determining a preset differential threshold according to the positioning precision requirement, wherein in response to that the first information meets the preset condition, sending the differential positioning information to the terminal comprises:

in response to that the differential value is greater than the preset differential threshold, sending the differential positioning information to the terminal.

2. The method of claim 1, wherein when the first information comprises the environmental information and the differential positioning information, in response to that the first information meets the preset condition, sending the differential positioning information to the terminal further comprises:

in response to that the environmental information is first environmental information, sending the differential positioning information to the terminal.

3. The method of claim 2, wherein the first environmental information comprises at least one of low air visibility information, rainy day information or airflow fluctuation information.

4. The method of claim 1, further comprising:
when the first information comprises the satellite positioning signal and the differential positioning information, performing calculation according to the satellite positioning signal and the differential positioning information to obtain a calculated location of a roadside device; and
determining, according to the calculated location and an actual location of the roadside device, a distance difference between the calculated location and the actual location,
wherein in response to that the first information meets the preset condition, sending the differential positioning information to the terminal further comprises:
in response to that the distance difference is greater than a preset distance difference threshold, sending the differential positioning information to the terminal.

5. The method of claim 1, further comprising:
in response to that the first information does not meet the preset condition, not sending the differential positioning information to the terminal.

6. An information sending device, comprising:
a processor; and
a memory having stored thereon computer program instructions;
wherein the processor is configured to execute the computer program instructions to:
obtain first information for positioning a terminal, wherein the first information comprises differential positioning information; or the first information comprises: at least one of environmental information or a satellite positioning signal, and the differential positioning information, wherein the differential positioning information comprises a differential value, and the differential value comprises a clock error between a satellite and a receiver, an atmospheric propagation delay and multipath effect; and
determine whether the first information meets a preset condition, and in response to that the first information meets the preset condition, send the differential positioning information to the terminal,
wherein the processor is further configured to execute the computer program instructions to:
receive a request from the terminal, wherein the request includes a positioning precision requirement; and
determine a preset differential threshold according to the positioning precision requirement,
wherein the processor is further configured to execute the computer program instructions to:
in response to that the differential value is greater than the preset differential threshold, send the differential positioning information to the terminal.

7. The device of claim 6, wherein when the first information comprises the environmental information and the differential positioning information,
the processor is further c figured to execute the con program instructions to:
in response to that the environmental information is first environmental information, send the differential positioning information to the terminal.

8. The device of claim 7, wherein the first environmental information comprises at least one of low air visibility information, rainy day information or airflow fluctuation information.

9. The device of claim 6, wherein the processor is further configured to execute the computer program instructions to:
perform calculation according to the satellite positioning signal and the differential positioning information to obtain a calculated location of a roadside device when the first information comprises the satellite positioning signal and the differential positioning information; and
determine a distance difference between the calculated location and an actual location of the roadside device according to the calculated location and the actual location,
send the differential positioning information to the terminal in response to that the distance difference is greater than a preset distance difference threshold.

10. The device of claim 6, wherein the processor is configured to execute the computer program instructions to:
in response to that the first information does not meet the preset condition, not send the differential positioning information to the terminal.

11. A computer storage medium, having stored thereon computer program instructions that when executed by a processor, implement operations of:
obtaining first information for positioning a terminal, wherein the first information comprises differential positioning information; or the first information comprises: at least one of environmental information or a satellite positioning signal, and the differential positioning information, wherein the differential positioning information comprises a differential value, and the differential value comprises a clock error between a satellite and a receiver an atmospheric propagation delay and multipath effect; and
determining whether the first information meets a preset condition, and in response to that the first information meets the preset condition, sending the differential positioning information to the terminal,
where when executed by the processor, the computer program instructions further implement operations of:
receiving a request from the terminal, wherein the request includes a positioning precision requirement; and
determining a preset differential threshold according to the positioning precision requirement,
wherein in response to that the first information meets the preset condition, sending the differential positioning information to the terminal comprises:
in response to that the differential value is greater than the preset differential threshold, sending the differential positioning information to the terminal.

12. The computer storage medium of claim 11, wherein when the first information comprises the environmental information and the differential positioning information,
in response to that the first information meets the preset condition, sending the differential positioning information to the terminal further comprises:
in response to that the environmental information is first environmental information, sending the differential positioning information to the terminal.

13. The computer storage medium of claim 12, wherein the first environmental information comprises at least one of low air visibility information, rainy day information or airflow fluctuation information.

14. The computer storage medium of claim 11, wherein when the computer program instructions are executed by a processor, the computer program instructions further implement operations of:
- when the first information comprises the satellite positioning signal and the differential positioning information, performing calculation according to the satellite positioning signal and the differential positioning information to obtain a calculated location of a roadside device; and
- determining, according to the calculated location and an actual location of the roadside device, a distance difference between the calculated location and the actual location,
- in response to that the distance difference is greater than a preset distance difference threshold, sending the differential positioning information to the terminal.

15. The computer storage medium of claim 11, wherein when the computer program instructions are executed by a processor, the computer program instructions further implement operations of:
- in response to that the first information does not meet the preset condition, not sending the differential positioning information to the terminal.

\* \* \* \* \*